Patented Mar. 26, 1929.                                                      1,707,005

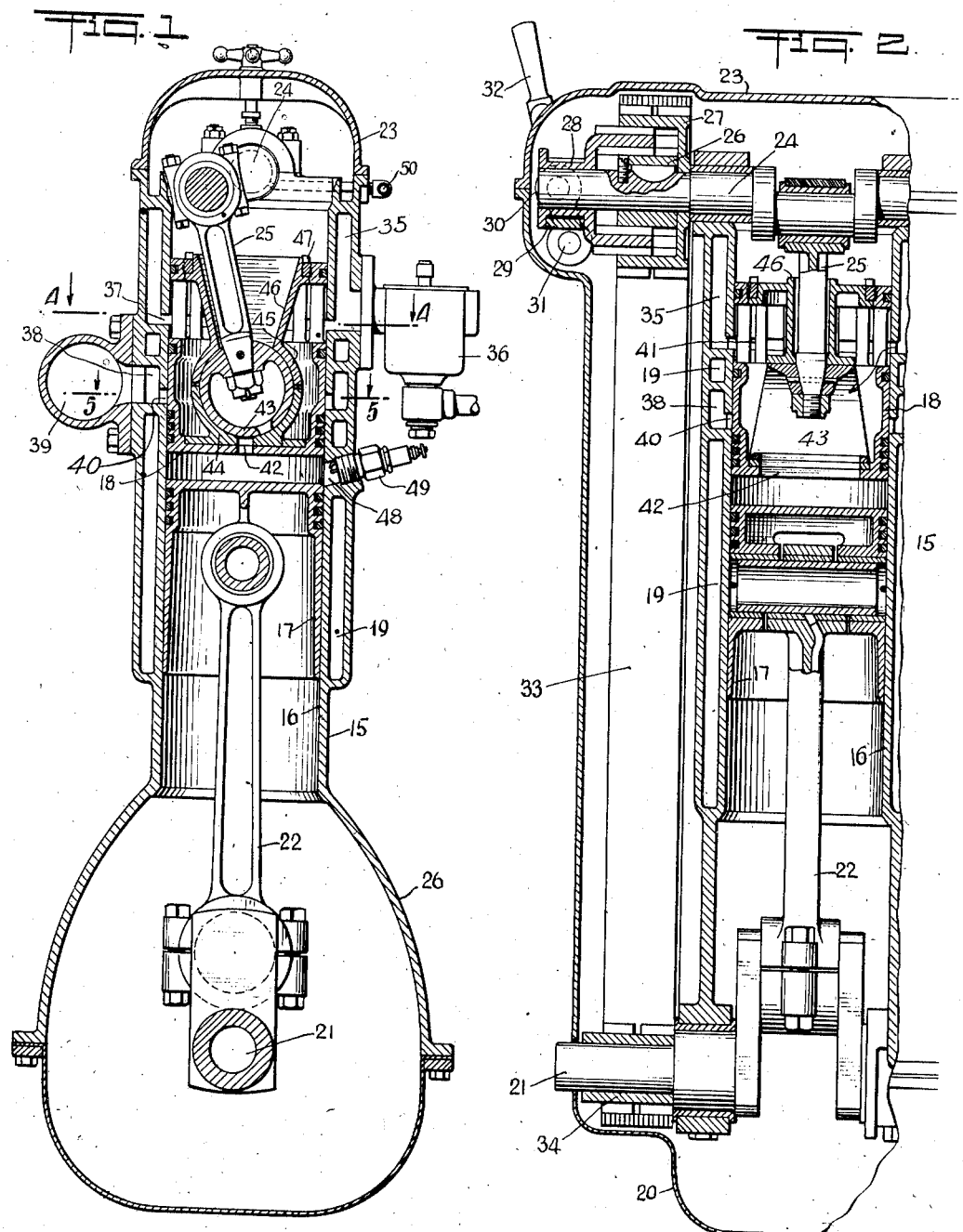

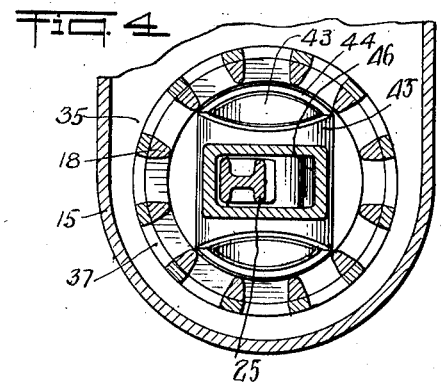
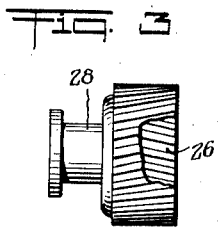
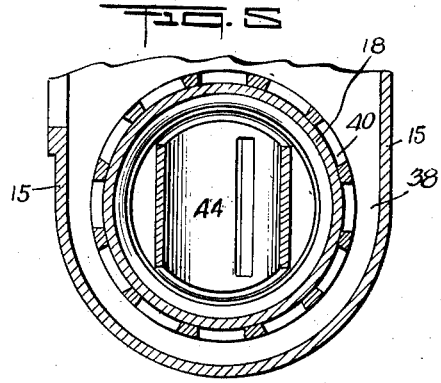
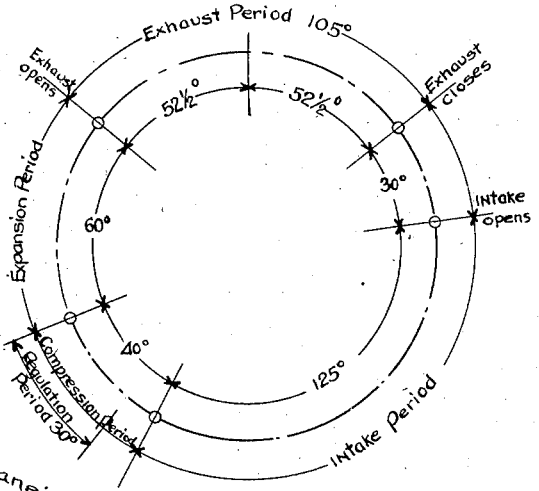
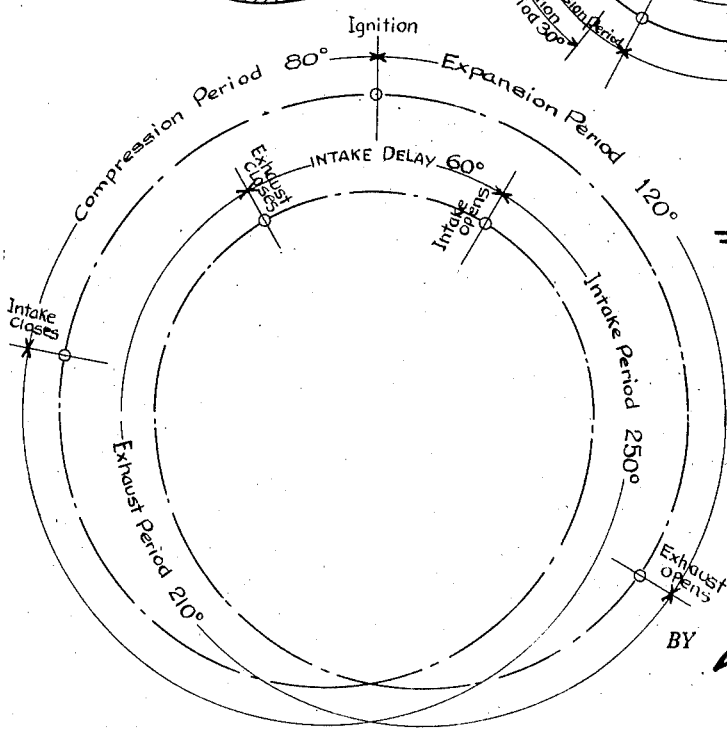
INVENTOR.
Milan W. Hall
BY
ATTORNEY March 26, 1929.    M. W. HALL    1,707,005
INTERNAL COMBUSTION MOTOR
Filed Jan. 8, 1927    3 Sheets-Sheet 3
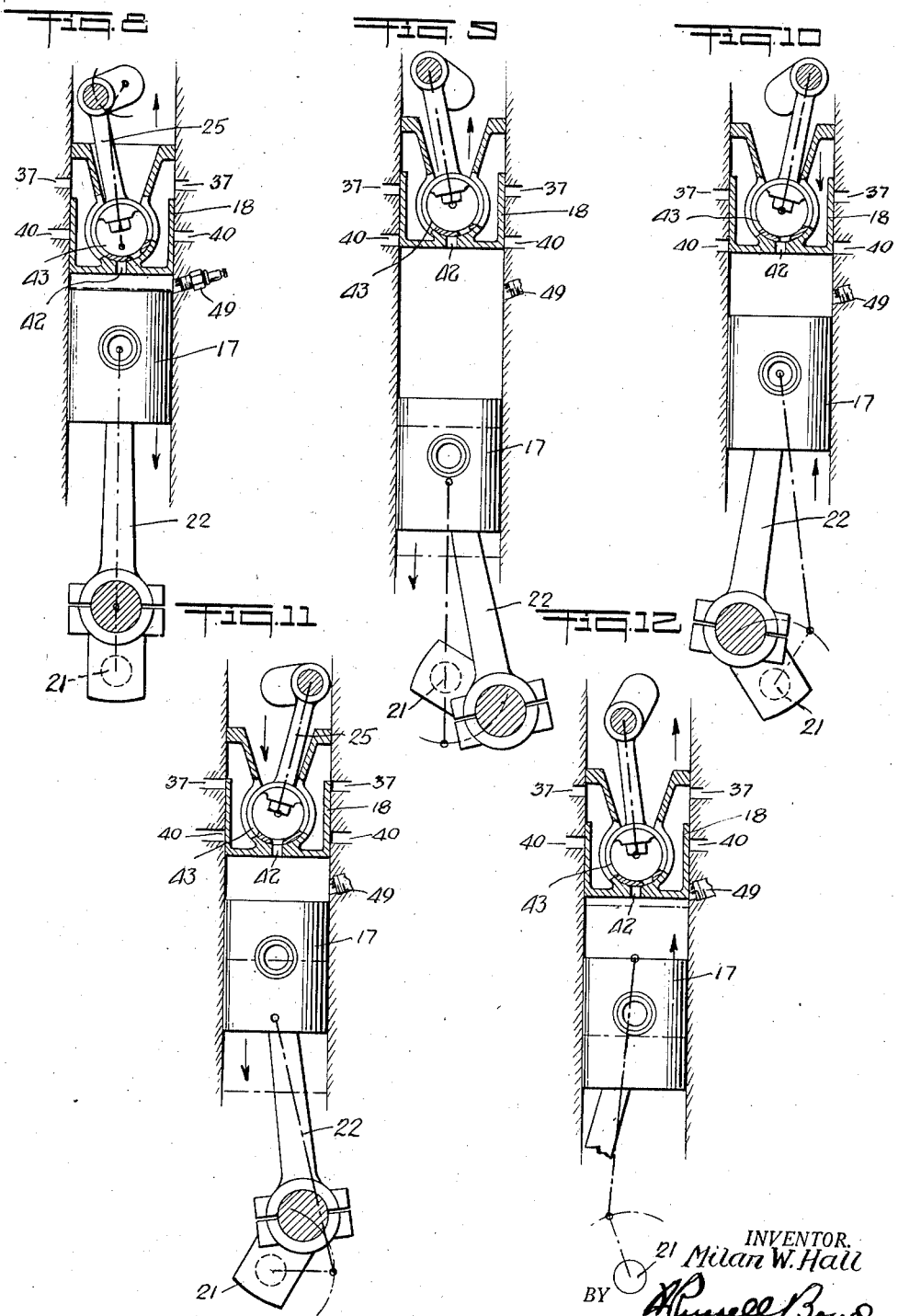
INVENTOR.
Milan W. Hall
BY
ATTORNEY.

UNITED STATES PATENT OFFICE.

MILAN W. HALL, OF NEW ROCHELLE, NEW YORK; MINETTA HALL, ADMINISTRATRIX OF SAID MILAN W. HALL, DECEASED, ASSIGNOR TO EDWIN B. LAPHAM, OF HOBOKEN, NEW JERSEY.

INTERNAL-COMBUSTION MOTOR.

Application filed January 8, 1927. Serial No. 159,840.

My invention relates to internal combustion motors and has for an object to improve the thermal function of compression in such motors, particularly when operating at reduced loads.

In pre-mixture type internal combustion motors, such as are in general use today, the compression stroke of the piston and the combustion space in the cylinder are fixed and the motor is controlled by a throttle which attenuates the fuel charge for lighter loads. The volume of the combustion space is limited by the fact that when the throttle is wide open for full loads, the fuel must not be compressed above the critical pressure at which spontaneous combustion takes place, with the result that when the motor is throttled down for light loads there is insufficient compression of the fuel charge. My invention aims to overcome this deficiency of ordinary internal combustion motors by providing means for varying the fuel charge volume without attenuation at the beginning of the compression period and simultaneously varying the combustion space volume in accordance with volumetric variations of the charge, whereby compression is maintained at constant or uniform pressure under all variations of load.

Another object of my invention is to improve the thermal function of expansion of internal combustion motors.

In the ordinary pre-mixture type of internal combustion motors, the expansion period of the piston is approximately equal to the compression period, whereas for ideal thermal efficiency, expansion of the ignited gases should far exceed their compression. My invention aims to provide a motor in which the expansion of the gases of combustion may be set at any desired ratio.

Another object of my invention is to provide an internal combustion motor of exceedingly simple construction which requires no throttle valve, poppet valves, nor sleeve valves.

Another object of my invention is to provide means for varying the timing of one piston with respect to the other opposed piston, whereby the volume of the fuel charge and the volume of the compression space are regulated to maintain a constant compression pressure under varying loads.

With these and other objects in view my invention consists in certain novel features of construction and combinations and arrangements of parts, which will be more fully hereinafter described and pointed out in the claims.

In the accompanying drawings,

Figure 1 is a view, in transverse vertical section, of an internal combustion motor embodying my invention;

Fig. 2 is a side view of a portion of the motor, shown largely in section;

Fig. 3 is a side view partly broken away, of a detail of my invention;

Figs. 4 and 5 are views in horizontal section taken on the lines 4—4 and 5—5 respectively, of Fig. 1;

Fig. 6 is a crank cycle diagram of the two-stroke piston of my motor;

Fig. 7 is a crank cycle diagram of the four-stroke piston of my motor; and

Figs. 8 to 12 inclusive, are schematic views showing the relative positions of the four-stroke and two-stroke pistons when operating at full load at the positions of ignition, opening of the exhaust, closing of the exhaust, opening of the intake, and closing of the intake, respectively, the corresponding positions of the pistons when set for light load, being indicated in the figures by dotted lines.

In the drawings I have used the reference numeral 15 to indicate the cylinder block of my engine, the block being formed with a plurality of cylinders 16, only one of which is shown in the drawings. Pistons 17 are fitted to reciprocate in the lower portion of the cylinders and pistons 18 are fitted to reciprocate in the upper portion of the cylinders. The cylinder block is provided with the usual water jacket 19 which surrounds that portion of the cylinders in which the main pistons reciprocate and also the lower part of that portion of the cylinders in which the auxiliary pistons reciprocate. The lower part of the cylinder block is formed with the usual crank case 20 in which is mounted a crank shaft 21 connected to the pistons 17 by means of connecting rods 22. At the upper end of the cylinder block there is another crank case 23 in which is mounted a crank shaft 24, the latter being connected by connecting rods 25 to the pistons 18.

The pistons 17 are adapted to operate on the four-stroke cycle and pistons 18 of the two-stroke cycle and hence the crank shafts 21 and 24 are connected by reduction gearing, such that the latter crank shaft shall run at half the speed of the former crank shaft. This gearing includes means for varying the relative angular position of the crank shaft 24 with respect to the crank shaft 21. To this end a spirally toothed wheel 26 is keyed to one end of the crank shaft 24. Mounted to rotate freely on the crank shaft 24 is another wheel 27 which is formed with a laterally extending rim peripherally surrounding but spaced from the wheel 26. The inner periphery of the rim 27 is formed with spiral teeth whose pitch or angle is reversed with respect to the spiral teeth on the wheel 26. Mounted to slide on the shaft 24 is a sleeve 28 which has an extension adapted to fit between the wheels 26 and 27. This sleeve is provided on the inner periphery of the extension with teeth adapted to engage the teeth of wheel 26 and on the outer periphery with teeth adapted to engage the teeth of wheel 27. The sleeve 28 carries a collar 29 which is connected by means of a yoke 30 to a control shaft 31. The latter projects through the outer wall of the cylinder block and carries a control lever 32. It will be evident that by operating the lever 32 to slide the sleeve 28 on the shaft 24, the position of the wheel 27 may be advanced or retarded angularly with respect to the wheel 26, without interfering with the driving of the wheel 27 by the wheel 26, or vice-versa, through the intermediacy of the toothed sleeve 28.

The wheel 27 is formed on its outer periphery with sprocket teeth adapted to engage a chain belt 33 which passes about a sprocket wheel 34 secured to the crank shaft 21. The diameter of the sprocket wheel 34 is one-half the diameter of the sprocket wheel 27 so that the crank shaft 21 is geared to make two revolutions for each revolution of the crank shaft 24, and hence the pistons 16 make two complete reciprocations for each reciprocation of the pistons 18. Furthermore, in the particular design shown in the drawings the length of the crank arms on the shaft 21 is twice that of the crank arms on the shaft 24, so that the piston speed of the pistons 17 is four times that of the pistons 18. This relation, however, is arbitrary and may be varied in different designs.

Immediately above the water jacket 19 the cylinder block is formed with an intake manifold 35, connected with a suitable carbureter 36. Ports 37 lead from the intake manifold into the cylinder 16. These ports are distributed about each cylinder, as shown in the cross sectional view Fig. 4, so as to provide an intake of broad area for the admission of the fuel mixture. At a point lower down on the cylinder block and within the water jacket, there is an exhaust manifold 38 connected with an exhaust pipe 39, and ports 40 distributed around the cylinder, lead therethrough to connect the cylinder with the exhaust, as shown in the cross sectional view Fig. 5. The ports 37 and 40 are adapted to be controlled by the piston 18.

The construction of the piston 18 is shown clearly in Figs. 1 and 2. It will be observed that the intake mixture is fed into the interior of piston 18 through ports 41 and is delivered to the cylinder, between the pistons 17 and 18, through a port 42 formed in the bottom of the latter piston. The port 42 is in the form of an elongated slot and is controlled by a hollow piston pin 43 which connects the rod 25 to the piston 18. The hollow piston pin 43 thus serves as a valve and is arranged to oscillate in a bearing carried by the piston 18. The bearing is preferably formed of a lower semi-cylindrical section 44 secured to the bottom wall of the piston 18 and provided with a port therein which registers with the port 42, and of an upper semi-cylindrical portion 45 provided with an extension 46 secured to the top of the piston by means of a threaded ring 47. The extension 46 has a slot therein through which passes the connecting rod 25, the slot being flared toward the top to provide freedom for angular movement of the connecting rod.

Figs. 1 and 2 show the position of the pistons at the point of ignition when set for full load, with a maximum combustion space between the two pistons. A port 48 is formed in each cylinder to receive a spark plug 49, by which the charge is fired. By moving the control lever 32 the position of piston 18 with respect to piston 17 may be adjusted to reduce the combustion space as may be desired for various loads. At the same time this adjustment varies the volume of fuel mixture to be compressed to said combustion space, as will be explained presently.

The lower piston 17 and its connection to the rod 22 are lubricated in the usual manner. To provide for lubricating the upper piston 18 and the pin 43, I provide an oil pipe 50 by which oil is delivered under pressure to the bearings of the crank shaft 24, thence the oil finds its way down to the piston 18 and through the slot in the extension 46 to the pin 43.

As explained above, the piston 17 operates through a four-stroke cycle while the piston 18 operates through a two-stroke cycle. When the charge in the combustion chamber is fired the pistons 17 and 18 are driven in opposite directions, the latter piston operating at a lower speed than the former piston, and both pistons deliver power to the crank shaft 21. The relative movement of the pistons will be understood by referring to the diagrams, Figs. 6 and 7. These diagrams show the angular positions of the two crank shafts, respectively, at various points in the cycles of the two pistons when set for operating at full load. It will be observed that the position of the crank shaft 24 may be adjusted through an angle of 30 degrees with respect to the crank shaft 21, in order to adapt the motor for various loads. The angles shown in the diagrams have been selected to represent a preferred relation between the two crank shafts, but I wish it to be understood that I do not limit myself to the specific angles shown nor to the specific regulation of 30 degrees between the auxiliary crank shaft and the main crank shaft.

The operation of my motor will be understood by referring to the schematic views 8 to 12 inclusive. In Fig. 8 the pistons are shown at the ignition point, at which point the lower crank is in vertical position or top center and the piston 17 is at the top of its stroke, while the upper crank has moved through an angle of $67\frac{1}{2}$ degrees from bottom center and has raised the piston 18 part way up on its rising stroke. In this position the exhaust ports 40 are closed and although the inlet ports 37 are open to the interior of the piston 18, the pin 43 has closed the main inlet port 42. When the charge is fired, it operates to drive the lower piston downward and the upper piston upward, thus delivering a certain portion of its power to the upper crank shaft 24, this power being transmitted through the chain 33 to the crank shaft 21. The expansion period continues while the lower crank passes through an angle of 120 degrees and the upper crank through an angle of 60 degrees, when, as shown in Fig. 9, the piston 18 will begin to uncover the exhaust ports 40. The exhaust ports will remain open while the lower crank is passing through a further angle of 210 degrees and the upper crank through an angle of 105 degrees, or $52\frac{1}{2}$ degrees past top center. This position is shown in Fig. 10, when it will be observed that the exhaust ports 40 are closed completely by the descending auxiliary piston. In the meantime, the throw of the upper crank will have turned the pin 43 to such position as to open the port 42, but the inlet ports 37 remain closed. The next view Fig. 11 shows the relation of the pistons after the lower crank has passed through an angle of 60 degrees, or 30 degrees past top center, during which time the upper piston has descended until the ports 37 begin to open. Since the port 42 has remained open during this part of the cycle, a charge of fuel will now flow into this cylinder, being drawn in by suction of the receding lower piston. The intake ports 37 and 42 remain open while the lower crank passes through an angle of 250 degrees, or 100 degrees past bottom center, when the parts will assume the position shown in Fig. 12 with the port 42 just closed and the compression period just beginning. During the part of the cycle just described, the charge drawn into the cylinder by descent of the lower piston will be partly rejected as the piston rises and will be forced back into the intake manifold; and so there is no attenuation of the fuel charge in the cylinder at the beginning of the compression period. During the compression period both pistons move upward, but the lower piston moves much more rapidly than the upper piston, so that the charge is compressed between the two pistons until they reach the position shown in Fig. 8, when the charge is ignited and a new cycle starts. As shown in the diagram Fig. 7, the expansion stroke of the lower piston is 120 degrees while the compression stroke is 80 degrees, and because the upper piston is receding during the expansion period, the ratio of expansion to compression is even greater. The point at which compression begins is so chosen that the fuel charge will not be compressed to or above the critical pressure in the combustion space.

When operating at lighter loads a greater part of the fuel charge in the cylinder is rejected by delaying the closing of the intake ports until the lower piston has risen higher on its upward stroke and full compression of this lighter charge is obtained by reducing the combustion space between the pistons. This result is effected by operating the control lever 32 to move the crank shaft 24 counterclockwise with respect to the crank shaft 21. Assuming that this relative setting has been effected through an angle of 30 degrees, the relative positions of the pistons at corresponding points in the cycle will appear as indicated by dotted lines in the Figs. 8 to 12. Timing of ignition is controlled by the lower crank shaft 21 in the usual manner, and since crank shaft 24 has been retarded 30 degrees with respect to crank shaft 21, the upper piston will have risen very slightly, as shown by the dotted line in Fig. 8, when ignition takes place. In other words, retarding of the upper crank shaft reduces the combustion space. The expansion stroke is also increased by the fact that the lower crank shaft must move through a full 180 degrees before the upper piston has risen far enough to uncover the exhaust ports. The exhaust stroke will continue while the lower piston rises to the top of its stroke and begins to recede before the exhaust ports will be closed. Intake will begin with the top of the lower piston at the dotted line in Fig. 11 and the intake ports will remain open while the lower piston is moving down to draw in the charge and moving up again to reject a part of the charge. Compression of the charge will not begin until the lower piston has risen to the dotted line position shown in Fig. 12. Thus at low loads a much smaller volume of fuel mixture is measured off by the relative movement of the two pistons, but this is compressed to the full degree of pressure before ignition by the relatively closer approach of the two pistons, as indicated by the dotted line position of the auxiliary piston in Fig. 8.

Thus I have provided for variations in combustion space and variation in fuel charge volume for different loads, both variations being effected by movement of a single control lever 32. My motor does not require the use of a throttle lever, as full control is afforded by the lever 32. However, it will be obvious that I could use a throttle to control the intake manifold whenever desirable or necessary to meet special conditions. In addition to providing for uniform compression, I have provided for a material increase in the ratio of expansion to compression, particularly in the case of light loads, so that the thermal efficiency of my motor may be actually higher at light loads than at heavy loads. This is of particular importance in automobile service in which motors are normally run at about a quarter of full load. In such service a marked economy in fuel consumption will be shown by my improved motor.

A number of mechanical advantages are to be found in the port control provided by my invention. It will be observed that the oscillating pin 43 has a slow angular movement while the piston 18 is moving rapidly, and a rapid angular movement while the piston is moving slowly. Thus the oscillating pin has but slight motion when it is under the greatest pressure, and the piston 18 opens the ports 37 rapidly at the beginning of the intake period. The oscillating pin is subjected to greatest pressure during the expansion stroke or while the parts are moving from the position shown in Fig. 8 to that shown in Fig. 9. During this period there is but slight angular movement of the oscillating pin, while at the same time the piston 18 is rising rapidly under the impulse of the burning fuel. During the exhaust period and while the oscillating pin is under little pressure, it turns rapidly to open the port 42, as shown in Fig. 10, and thereafter has but slight movement while the piston 18 is moving downward rapidly to the position shown in Fig. 11, when the inlet ports 37 are opened. Finally, the oscillating pin turns rapidly to close the port 42 and begin the compression period, as shown in Fig. 12. Owing to this rapid opening of the intake ports 37, there is no throttling or choking action tending to retard the flow of the fuel mixture into the working cylinder, and the quick closing of the port 42 clearly defines the beginning of the compression period.

It is also to be noted that the pin 43 and the lower bearing or seat 44 are pressed together practically all of the time and particularly when pin 43 is functioning to control the intake. Thus at the moment of ignition there is an upward compression pressure of the piston 18 and seat 44 against the pin 43, serving to keep the pin seated and prevent leakage back into the intake manifold. This pressure is continued during the expansion stroke, and during the exhaust period the rising piston 17 exerts a slight upward pressure against the piston 18, holding the seat against the pin 43 while the latter is opening the port 42. During the first part of the intake period, the crank shaft 24 presses the pin 43 against the seat 44, and on the upward stroke of the piston 17 just prior to the beginning of the compression period, there is an upward pressure against the piston 18 serving to seat the pin 43 snugly, while the pin is closing the port 42. Thus there is never any knocking of the pin 43 in its bearing and considerable wear could take place between the pin 43 and its seat 44 without interfering in the least with the successful operation of the motor because the pin is always firmly seated when called upon to control the intake. By making the bearing for pin 43 in two semi-cylindrical sections, the upper one of which may be forced downward by means of the threaded ring 47, I provide for taking up slack between the pin 43 and the lower section or seat 44, when the wear becomes excessive.

It will be noted that my improved motor is "valveless", in the same sense that any ordinary two-cycle motor is "valveless". In other words, I do not use any inert auxiliary parts to control the ports. No power is wasted in moving valves against spring pressure or gas pressure to open the ports, and no inert sleeve members are employed to control the ports. Instead I use a working piston to control the intake and exhaust by its position in relation to the cylinder and in relation to the piston pin. In the latter respect my control of the intake differs from the ordinary two cycle motor, for I pass the intake mixture through the piston 18. Furthermore, the cool fuel mixture flows back and forth through the piston during a part of each cycle and serves to keep down the temperature of the piston pin 42. It will be realized that this is a very important feature of my invention.

The upper portion of my motor is not to be considered merely as a valve gear, but should be recognized as a power delivering part of the motor. In the particular design shown, the four-stroke piston delivers the greater part of the power, but my invention is not limited to this particular design. It will be evident that the parts could be so proportioned that the two-cycle pistons would deliver more power than the four-cycle pistons, or that they could both deliver equal power. There are marked advantages in delivering equal power to the two crank shafts, particularly in aeronautic service, in which it is common practice to provide two speeds, one of which is twice the speed of the other, and, with my engine, such variation of speed could readily be obtained by direct coupling to one or the other of my crank shafts without the interposition of transmission gears.

While I have shown the pistons 17 and 18 as of the same diameter, I do not limit myself to such construction, for it is obvious that I could employ pistons of different diameters, operating in a stepped cylinder, thereby varying the relative power delivered by the two pistons. Obviously, too, variation of relative power could also be obtained by varying the length of the crank arms on the two crank shafts.

Having thus described my invention and with the understanding that various changes, alterations and modifications may be made in the construction and arrangement of my motor without departing from the spirit and scope of my invention.

I claim:

1. In an internal combustion motor, a cylinder, a pair of pistons reciprocable therein and cooperating to provide a combustion space therebetween, a power shaft operatively connected to said pistons, said pistons being arranged to move simultaneously in opposite directions under the impulse of each explosion in the combustion space and each piston delivering power to the power shaft, the cylinder being formed with intake and exhaust ports, and one of said pistons providing sole control for the opening and closing of said ports, and means for varying the relative timing of said pistons to vary the volume of said combustion space.

2. In an internal combustion motor, a cylinder, a pair of pistons reciprocable therein, said pistons cooperating to provide a combustion space therebetween, a power shaft operatively connected to said pistons, one of said pistons being adapted to operate on a four-stroke cycle and the other on a two-stroke cycle and each piston delivering power to the power shaft, the cylinder being formed with intake and exhaust ports, the two-stroke piston providing sole control for the opening and closing of said ports, and means for varying the relative timing of said pistons to vary the volume of said combustion space.

3. In an internal combustion motor, a cylinder, a pair of pistons reciprocable therein, said pistons cooperating to provide a combustion space therebetween, a power shaft operatively connected to said pistons, one of said pistons being adapted to operate on a four-stroke cycle and the other on a two-stroke cycle and each piston delivering power to the power shaft, the cylinder being formed with intake and exhaust ports, the two-stroke piston providing sole control the opening and closing of said ports, and means for varying the relative timing of said pistons to vary the volume of said combustion space and the volume of the fuel charge retained in the cylinder.

4. In an internal combustion motor, a cylinder, a piston reciprocable therein, a crank shaft, a connecting rod carried by the crank shaft, and a hollow piston pin secured to the connecting rod and journaled to oscillate in the piston, the piston being formed with a fuel passage leading therethrough and through said piston pin, the latter serving by oscillatory movement therof to open and close said fuel passage.

5. In an internal combustion motor, a cylinder having a working chamber, a hollow piston reciprocable in the cylinder, a hollow piston pin journaled in the piston and communicating with the interior thereof, a crank shaft, and a connecting rod pivotally connected at one end to an arm of the crank shaft and secured at the other end to the piston pin, the cylinder and the piston being formed with ports coacting periodically to open communication with the interior of the piston, the piston being also formed with a passage leading from the journal of the piston into the working chamber of the cylinder, and the piston pin being provided with a port cooperating upon oscillatory movement of the pin during reciprocation of the piston to periodically open said passage.

6. In an internal combustion motor, a cylinder having a working chamber and formed with an exhaust port opening out of said chamber, a piston formed with a fuel chamber therein and reciprocable in the cylinder, said piston being adapted to open and close said exhaust port, said cylinder and piston being formed with inlet ports adapted periodically to establish communication with said fuel chamber, a hollow piston pin journaled in the piston and open to said fuel chamber, a crank shaft, and a connecting rod pivotally connected at one end to an arm of the crank shaft and secured at the other end to the piston pin, the piston being formed with a passage leading from the journal of the piston into the working chamber, the piston pin being formed with a port adapted upon oscillatory movement of the pin during reciprocation of the piston to open said passage periodically to the interior of the piston.

7. In an internal combustion motor, a pair of crankshafts, a pair of intermeshing spirally toothed wheels driven by said crankshafts respectively, and means for effecting relative axial movement of said wheels to advance one crankshaft angularly with respect to the other.

8. In an internal combustion motor, a pair of crankshafts, a spirally toothed wheel driven by one crankshaft, a second spirally toothed wheel driven by the other crankshaft, a toothed idler engaging the said wheels, and means for sliding the idler axially to advance one crankshaft angularly with respect to the other.

9. In an internal combustion motor, a pair of crank shafts, a spirally toothed wheel driven by one shaft, a second wheel concentric with the first wheel and driven by the other shaft, the second wheel being formed with internal spiral teeth reversely pitched with respect to the teeth of the first wheel, a sleeve slidable between said wheels and formed with external and internal spiral teeth engaging the teeth of said wheels, and means for sliding the sleeve axially to advance one crank shaft angularly with respect to the other.

10. In an internal combustion motor a plurality of cylinders each formed with a fuel port, a manifold adapted to supply fuel to the cylinders through said fuel ports, a pair of power-delivering pistons reciprocable in each cylinder in relatively timed relation, one of said pistons in each cylinder being formed with a fuel passage adapted periodically to communicate with the fuel port whereby on relative movement of the two pistons a charge of fuel will first be drawn into the cylinder and a part of the charge will then be returned to the manifold, means for closing the passage to retain a predetermined amount of fuel in the cylinder, and means for varying the relative timing of the two pistons to vary the amount of fuel retained in the cylinder.

11. In an internal combustion motor a plurality of cylinders each formed with a fuel port, a manifold adapted to supply fuel to the cylinders through said fuel ports, a pair of power-delivering pistons reciprocable in each cylinder in relatively timed relation, one of said pistons in each cylinder being formed with a fuel passage adapted periodically to communicate with the fuel port whereby on relative movement of the two pistons a charge of fuel will first be drawn into the cylinder and a part of the charge will then be returned to the manifold, means for closing the passage to retain a predetermined amount of fuel in the cylinder, and means for varying the relative timing of the two pistons to vary the amount of fuel retained in the cylinder and vary the volume of said combustion space proportionately to the amount of fuel retained so as to preserve uniform compression of fuel in the combustion space.

12. In an internal combustion motor, a cylinder providing a working chamber and formed with a fuel port, a hollow piston reciprocable in the chamber, the piston being formed with a lateral port adapted upon the reciprocation of the piston to alternately open and close the fuel port, the piston being also formed with a bottom port leading into the working chamber, a crank shaft, a connecting rod carried thereby, a hollow piston pin secured to the connecting rod and journalled in the piston in open communication with the hollow interior thereof, the piston pin being formed with a port adapted to register with said bottom port at certain predetermined angular positions of the crank shaft whereby the bottom port will be opened before each opening of the lateral port and closed before each closure of the lateral port.

Signed at New York, in the county of New York and State of New York, this 4th day of January, A. D. 1927.

MILAN W. HALL.